United States Patent [19]

Takenaka et al.

[11] Patent Number: 4,513,609
[45] Date of Patent: Apr. 30, 1985

[54] ELECTROMAGNETIC ROTATION DETECTING APPARATUS

[75] Inventors: Akihiko Takenaka, Kariya; Miyao Arakawa, Nagoya; Masahiro Sato, Toyoake; Toshiyuki Yamaguchi, Nishio, all of Japan

[73] Assignee: Nippondenso Co., Ltd., Kariya, Japan

[21] Appl. No.: 502,653

[22] Filed: Jun. 9, 1983

[30] Foreign Application Priority Data

Jun. 14, 1982 [JP] Japan ................... 57-100638

[51] Int. Cl.³ .................................. G01M 15/00
[52] U.S. Cl. .................................... 73/116
[58] Field of Search ............ 73/116, 118, 117.3, 73/117.2; 340/672, 870.11, 870.31; 123/414, 416, 417

[56] References Cited

U.S. PATENT DOCUMENTS 3,842,299  8/1974  Lombard ............... 340/870.31 X
4,036,190  7/1977  Bigliani et al. ............... 123/416

Primary Examiner—Jerry W. Myracle
Attorney, Agent, or Firm—Cushman, Darby & Cushman

[57] ABSTRACT

A rotation detecting apparatus includes a first electromagnetic pickup of the electromagnetic coil type positioned to face a single signal rotor in the diametrical direction thereof and generate a first rotation signal, a permanent magnet received in a recess formed in the principal plane surface of the signal rotor, and a second electromagnetic pickup including a magnetoresistance effect element positioned separately above the upper surface of the permanent magnet and operatively associated with the magnet to generate a second rotation signal.

4 Claims, 7 Drawing Figures

ELECTROMAGNETIC ROTATION DETECTING APPARATUS

BACKGROUND OF THE INVENTION

The present invention relates to improvements in electromagnetic rotation detecting apparatus and more particularly to the reduction of the size of a rotation detecting apparatus of the magnetic detection type in which at least one pulse in each of two or more different series of signals is generated for every rotation of the apparatus. That is, a first signal is generated by an electromagnetic coil type pickup and a second signal is generated by a magnetoresistance effect element or Hall generator.

FIG. 1 shows an example of the above-mentioned rotation detecting apparatus for generating two or more series of signals, in which electromagnetic coil type pickups 4 and 14 are respectively arranged to face signal rotors 3 and 13 which are mounted on a rotary shaft 1 with a spacing S there between. With this known construction, it is necessary to suitably provide the spacing S such that, as for example, a leakage flux generated from the permanent magnet of one of the electromagnetic coil-type pickups as shown at numeral 19 in the Figure is not easily detected by the other electromagnetic coil type pickup, and this makes it difficult to reduce the size of the apparatus.

SUMMARY OF THE INVENTION

It is an object of the present invention to provide an improved electromagnetic rotation detecting apparatus including a first electromagnetic pickup arranged to diametrically face a signal rotor fixedly mounted on a rotary shaft and generate a first rotation signal, and to provide a second electromagnetic pickup arranged to vertically face the plane surface of the signal rotor and generate a second rotation signal, whereby a first rotation signal is detected and generated in the diametrical direction of the plane surface of the single signal rotor and a second rotation signal is detected and generated in the vertical direction of (i.e., perpendicular to) the plane surface thereby reducing the size of the apparatus. In accordance with the present invention there is no need to use two signal rotors and the space for separating the rotors from each other is reduced thereby reducing the size of the apparatus.

DESCRIPTION OF THE PREFERRED EMBODIMENTS

Figure 1:
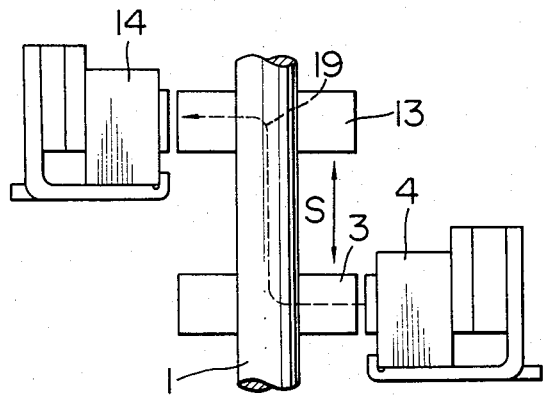
FIG. 1 is a schematic diagram showing an example of the prior art rotation detecting apparatus.

With the apparatus according to the invention, two kinds of electromagnetic pickups, i.e., a coil-type pickup and another pickup including a magnetic sensitive element (magnetogalvanic conversion element, such as a magnetoresistance effect element or Hall generator) are used in the embodiments of the apparatus of this invention which will be described later, and therefore these two types will be both be described generically by simply referring to the term "electromagnetic pickup" in the specification. In accordance with a preferred embodiment of this invention at least one pulse in each of two or more series of signals is generated for every rotation of the apparatus as will be described later. That is, in a rotation detecting apparatus of the magnetic detection type, the electromagnetic coil-type pickup is arranged to diametrically face a single signal rotor and generate a first rotation signal, the signal rotor icluding a toothed portion having a sufficient thickness and a permanent magnet received in a centrally formed recess. A sensor case is mounted above the upper surface of the signal rotor for containing the magnetoresistance effect element or Hall generator for generating second and subsequent signals. The present invention will now be described in greater detail with reference to the drawings. In the drawings, the same reference numerals designate the same component parts.

Figure 2:
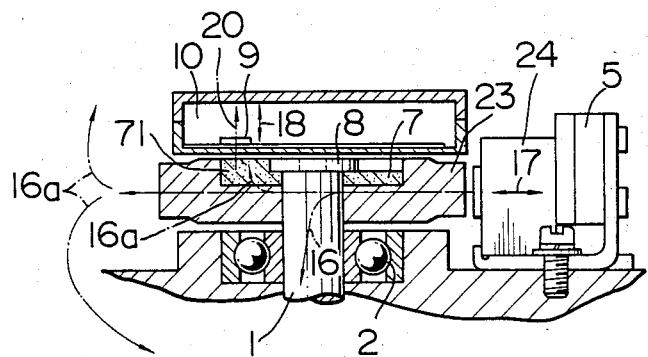
FIG. 2 is a cross-sectional view showing an embodiment of the present invention.
Figure 3:
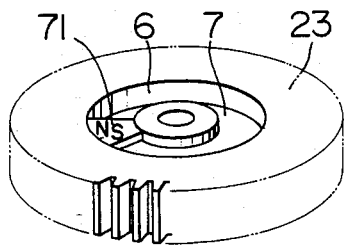
FIG. 3 is a perspective view of the signal rotor in the apparatus of FIG. 2.

FIG. 2 shows a cross-sectional view of a first embodiment of the invention, and FIG. 3 is a perspective view of a signal rotor 23.

Figure 4:
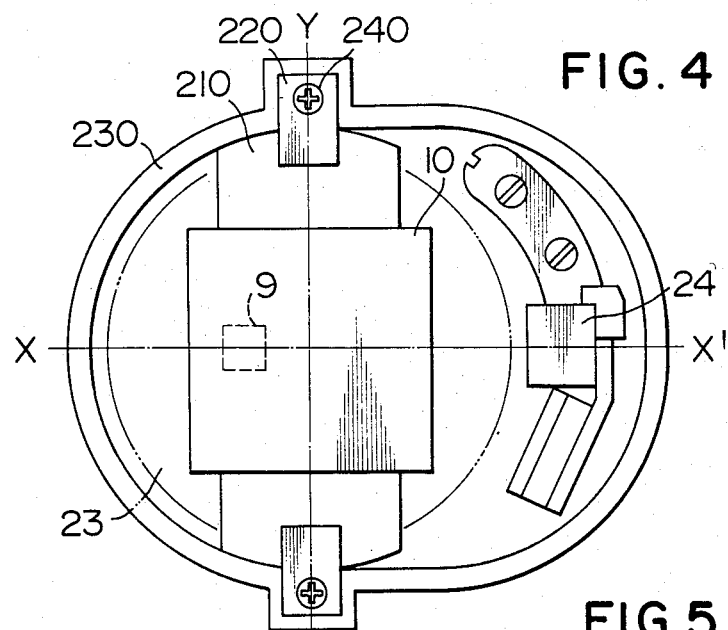
FIG. 4 is a partial plan view of the apparatus of FIG. 2.

In FIGS. 2 and 3, a shaft 1 is rotatably fitted in a bearing 2 and the signal rotor 23 is fixedly mounted on the shaft 1 by a driving fit, soldering or the like means. An electromagnetic pickup 24 is of the type which detects the amount of change of the magnetic flux by a coil or it may equally be of the type which employs a magnetic sensitive element such as a Hall generator which will be described later. The electromagnetic pickup 24 is fixed in position with screws so as to face the teeth of the signal rotor 23 and provide a certain air gap therebetween. Numeral 5 designates a permanent magnet for the electromagnetic coil-type pickup 24. A permanent magnet material 7 having a sector-shaped projecting pole portion 71 is fixed in place in a recess 6 formed centrally in the signal rotor 23 as shown in FIG. 3 by means of bonding or a plate 8. A Hall generator or magnetoresistance effect element 9 is contained in a sensor case 10 and arranged at a position which is opposite to the projecting pole portion 71 and remote from the electromagnetic coil-type pickup 24. The sensor case 10 is mounted fixedly on the upper surface of the signal rotor 23. When the signal rotor 23 is rotated, the Hall generator or magnetoresistance effect element 9 detects a change in the flux density due to the magnet 7 and generates a rotation signal. FIG. 4 is a plan view of the apparatus. As shown in FIG. 4, the sensor case 10 includes mounting portions 210 adapted to contact with the inner periphery of a housing 230 and the mounting portions 210 are pressed by plates 220 and fixedly mounted in place with screws 240. Thus, in this section the phase adjustment of the output from the sensor case 10 and the output from the electromagnetic coil-type pickup 24 can be effected. While, in the FIG. 4, the magnetic sensitive element 9 and the pickup 24 are arranged side by side along a horizontal axis X—X, if necessary, the screws 240 may be loosened so that the mounting portions 240 which are integral with the sensor case 10 are rotated by the necessary angle from an axis Y—Y' along the inner wall of the housing 230 and are again fixed in place by th screws 240 and the plates 220 thereby effecting the phase adjustment. By rotating the signal rotor 23 as shown in FIG. 2, it is possible to produce a plurality of pulse signals from the electromagnetic coil-type pickup 24. Since the thickness of the toothed portion of the signal rotor 23 is made sufficiently large, thus ensuring large variations in the magnetic flux, it is possible to produce a large output even at low speeds. Also, another series of outputs different from that of the electromagnetic coil-type pickup 24 are generated from the magnetic sensitive element 9 responsive to flux density changes 18 due to the projecting pole portion 71 received in the recess 6 of the signal rotor 23. As shown in FIG. 3, the permanent magnet material 7 is magnetized to provide adjoining north and south poles on the surface of the projecting pole portion 71 and the remaining portion is not magnetized. Then, due to the fact that the electromagnetic coil-type pickup 24 for detecting the amounts of flux changes in the directions 17 and the magnetoresistance effect element or Hall generator 9 for detecting the flux density changes in the directions 18 include sensors which are different in nature and that the construction shown in FIG. 2 is used, a leakage flux 16 from the electromagnetic coil-type pickup 24 passes in the axial direction of the shaft 1 as shown in the Figure. While some of the leakage flux flows as shown by arrows 16a, the permeability of the permanent magnet material 7 is as low as that of air and therefore there exists a condition which is the same as if there is a space in the portion of the magnet material 7 thereby reducing the effect on the magnetic sensitive element 9. As regards the magnetic flux from the pole portion 71, due to the north and south poles formed on its surface by the magnetization as shown in FIG. 3, the magnetic flux flows in a direction 20 (perpendicular to a principal plane surface of the rotor) in FIG. 2 and thus the electromagnetic coil-type pickup 24 is not easily affected even if the pole portion 71 is brought near to the electromagnetic coil-type pickup 24 by the rotation of the shaft 1. By taking advantage of these features, it is possible to reduce the occurrence of a phenomenon (magnetic interference) which accompanies the known construction of FIG. 1 including the two electromagnetic pickups that is, the phenomenon in which the leakage flux 19 from the electromagnetic pickup 4 passes through the shaft 1 and is detected by the other electromagnetic pickup 14, thus causing noise in the output, and this eliminates the need to provide the magnetic interference preventing space (the magnetic interference preventing air gap S) with the resulting reduction in the size of the apparatus. Also, by incorporating in the sensor case 10 a waveform reshaping circuit for the signal from the electro-magnetic pickup 4, it is possible to provide a small rotation detecting apparatus which generates a rectangular waveform. Further, in accordance with this embodiment the number of the poles formed in the permanent magnet material 7 may be changed to change the number of signals generated per revolution. Still further, the number of magnetic sensitive elements may be increased to generate greater series of signals per revolution.

Figure 5:
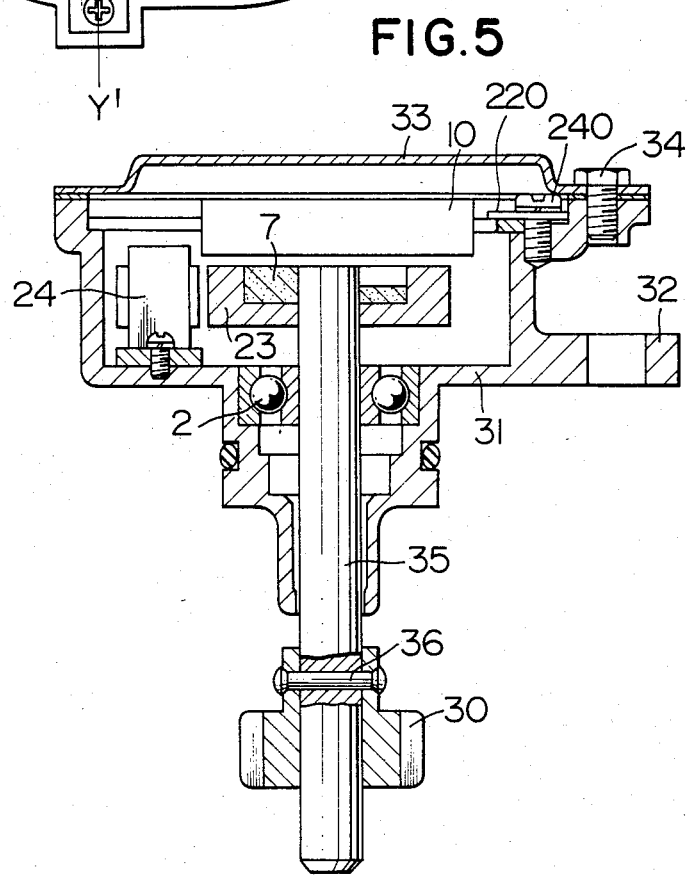
FIG. 5 shows the construction of an internal combustion engine rotational position detecting apparatus incorporating the apparatus of FIG. 2.

FIG. 5 shows another embodiment of the invention incorporating the above-described construction in an internal combustion engine rotational position detecting apparatus. A gear 30 is fixedly mounted in place by caulking a pin 36 against a shaft 35. A cap 33 is fixed to a housing 31 with bolts 34, and numeral 32 designates a flange for mounting the apparatus body on the engine.

Figure 6:
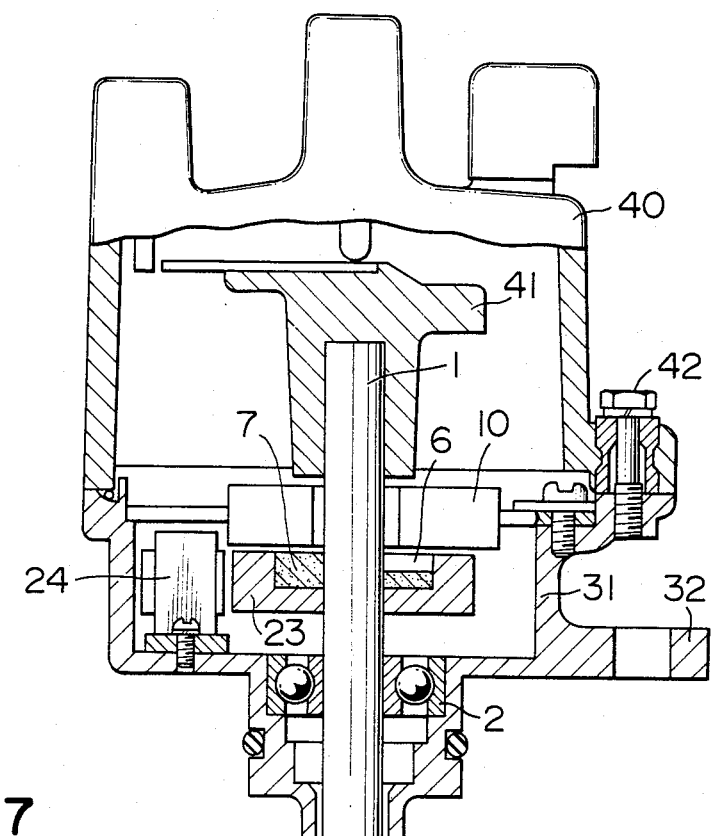
FIG. 6 shows the construction of an internal combustion engine ignition distributor incorporating the apparatus of FIG. 2.
Figure 7:
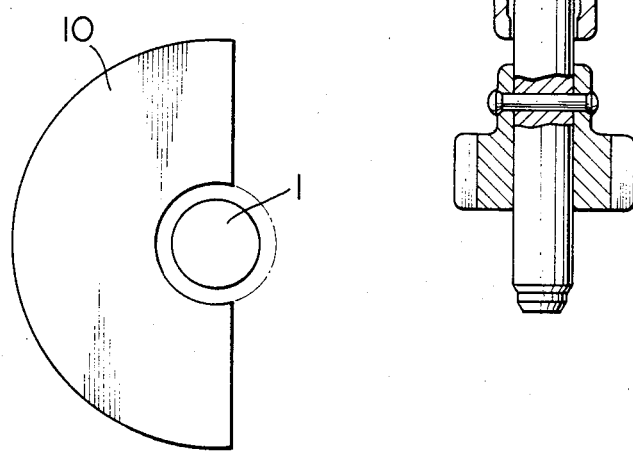
FIG. 7 shows a sensor case for use with the construction of FIG. 6.

FIG. 6 shows another embodiment of the invention incorporating the construction of FIG. 2 in an internal combustion engine ignition distributor. A cap 40 is fixed to a housing 31 with bolts 42. Numeral 41 designates a distributor rotor. FIG. 7 shows the sensor case 10 formed into a ring-shape or U-shape so as to be mounted in the distributor without any interference with the shaft 1 with the mounting method the same as in the case of FIG. 4.

From the foregoing description it will be seen that in accordance with the invention there is thus provided a rotation detecting apparatus which is small in size and capable of generating multiple series of signals and it is possible to reduce the size of a device utilizing the apparatus of the present invention, e.g., a rotational position detecting apparatus and ignition distributor. Thus, the present invention has great structural and economical merits for such environments.

We claim:

1. An electromagnetic rotation detecting apparatus for an internal combustion engine comprising:
   a housing;
   a rotary shaft rotatably received in said housing and adapted to be rotatably drive by said engine;
   a signal rotor fixedly mounted on said rotary shaft, said rotor including magnetic pole means for producing a magnetic flux in a direction substantially perpendicular to a principal plane surface thereof;
   first electromagnetic pickup means, facing said signal rotor in the diametrical direction thereof, for magnetically detecting and generating a first rotation signal from said rotor;
   second electromagnetic pickup means, operatively associated with said magnetic pole means of said signal rotor, for magnetically detecting and generating a second rotation signal from said rotor;
   case means for containing and holding said second electromagnetic pickup means so that it faces said magnetic pole means, said case means being positioned parallel to said principal plane surface of said signal rotor; and
   means for mounting said case means such that the angular position of said case means relative to said housing is adjustable.

2. An apparatus according to claim 1, wherein said second electromagnetic pickup means comprises one of a Hall generator and a magnetoresistance effect element.

3. An apparatus as in claim 1, wherein said apparatus is adapted to be driven by an ignition distributor of said engine.

4. An electromagnetic rotation detecting apparatus comprising:
   a housing;
   a rotary shaft rotatably received in said housing and adapted to be rotatably driven;
   a signal rotor fixedly mounted on said rotary shaft, said rotor including magnetic pole means for producing a magnetic flux in a direction substantially perpendicular to a principal plane surface thereof;
   first electromagnetic pickup means, facing said signal rotor in the diametrical direction thereof, for magnetically detecting and generating a first rotation signal from said rotor;

second electromagnetic pickup means, operatively associated with said magnetic pole means of said signal rotor, for magnetically detecting and generating a second rotation signal from said rotor;

case means for containing and holding said second electromagnetic pickup means so that it faces said magnetic pole means, said case means being positioned parallel to said principal plane surface of said signal rotor; and means for mounting said case means such that the angular position of said case means relative to said housing is adjustable.

* * * * *